(12) United States Patent
Tooman

(10) Patent No.: US 6,192,989 B1
(45) Date of Patent: Feb. 27, 2001

(54) TEMPORARY HORSESHOE

(76) Inventor: Barbara A. Tooman, 2315 Hannemann Rd., Grafton, WI (US) 53024

( * ) Notice: Subject to any disclaimer, the term of this patent is extended or adjusted under 35 U.S.C. 154(b) by 0 days.

(21) Appl. No.: 09/260,765

(22) Filed: Mar. 2, 1999

(51) Int. Cl.$^7$ .................................................. A01L 5/00
(52) U.S. Cl. .................................................. 168/1; 54/82
(58) Field of Search .................. 54/82; 168/1, 4, 168/12, 17, 18

(56) References Cited

U.S. PATENT DOCUMENTS

| | | | |
|---|---|---|---|
| 1,035,537 | * | 8/1912 | Cook ........................................ 168/1 |
| 3,782,473 | * | 1/1974 | Spencer .................................... 168/4 |
| 3,917,000 | * | 11/1975 | Spencer .................................... 168/4 |
| 3,967,683 | * | 7/1976 | Ensinozo ................................... 168/4 |
| 4,116,278 | * | 9/1978 | Spencer .................................... 168/4 |
| 4,346,762 | * | 8/1982 | Tovim ...................................... 168/4 |
| 4,470,466 | * | 9/1984 | Nakanishi ............................... 168/18 |
| 4,899,824 | * | 2/1990 | Techer et al. ........................... 168/14 |
| 5,209,048 | | 5/1993 | Hanson . |
| 5,533,575 | * | 7/1996 | Brown ..................................... 168/4 |

OTHER PUBLICATIONS

"Easyboot" advertisement.
"Slypner Athletic Horseshoes" advertisement.
"Shcokshod International" advertisement.
"Equithotics, Inc." advertisement.
"Equine Slipper" advertisement, Dover Catalog, Spring, 1999.
"Davis Barrier Boot" advertisement, State Line Track Catalog, Spring, 1999.

* cited by examiner

Primary Examiner—Thomas Price
(74) Attorney, Agent, or Firm—Andrus, Sceales, Starke & Sawall, LLP

(57) ABSTRACT

A temporary horseshoe capable of being quickly and easily attached and removed from the hoof of a horse. The horseshoe includes a sole having a toe and heel formed of an elastomeric material using a conventional injection molding process. The properties of the elastomeric material allow the sole of the shoe to be durable and other portions to be flexible. The shoe includes an opening in the center of the sole to closely resemble a conventional steel shoe. The opening extends through the heel of the sole, forming a pair of opposed heel portions that may be flexed outwardly to facilitate the insertion of the hoof into the shoe. A heel plate is located in each heel portion that urges the heel portion to return to its original position when flexed and presses the hoof forward into engagement with the sole. The sole also contains a pair of retention panels that extend over the toe of the sole and act to retain the horse's hoof within the shoe by pressing the hoof against the base and heel of the sole. The shoe is securely fastened to the hoof by a securing arrangement extending around the ankle of the horse. The securing arrangement is pivotably mounted to a pair of tabs extending from the sole of the shoe. The arrangement includes a hook and loop closure that allows the arrangement to be adjusted to fit the ankle of any individual horse. The arrangement also includes a foam pad disposed on the interior of the arrangement to prevent the arrangement from rubbing against, and irritating, the rear of the ankle of the horse.

24 Claims, 3 Drawing Sheets

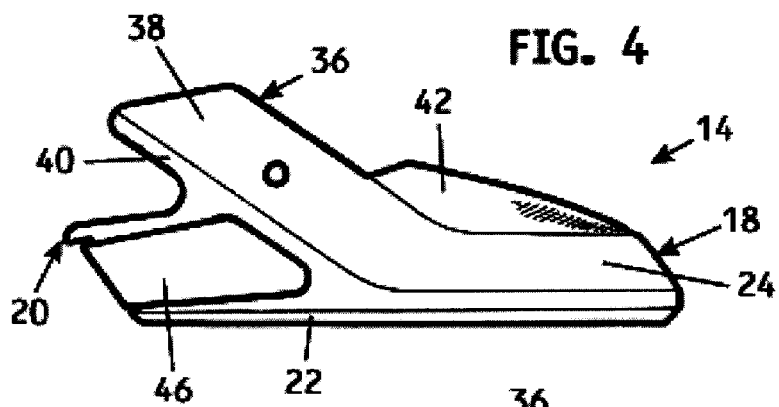
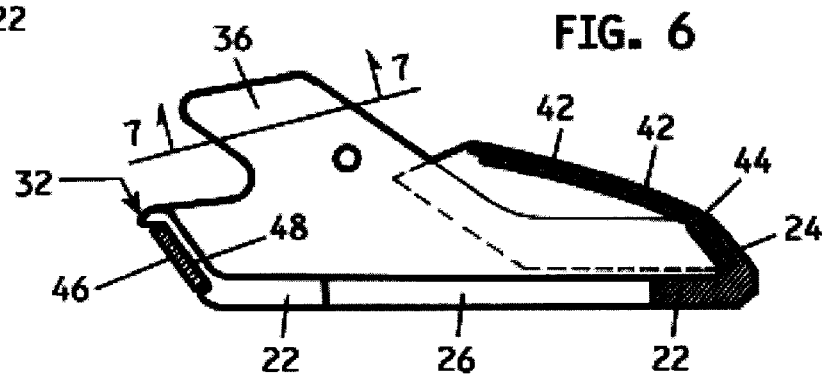
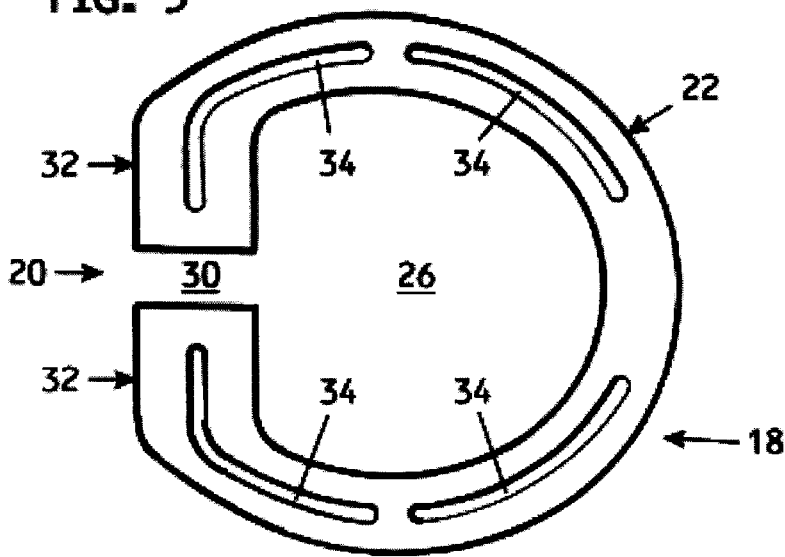
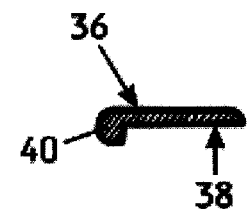
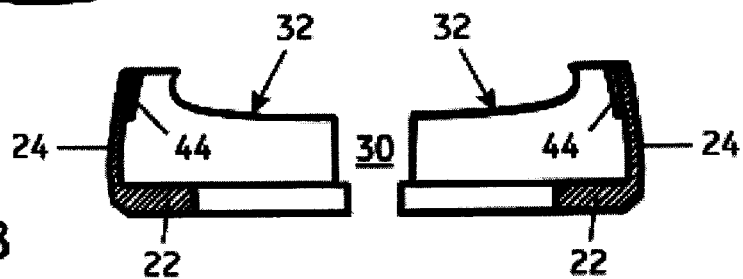

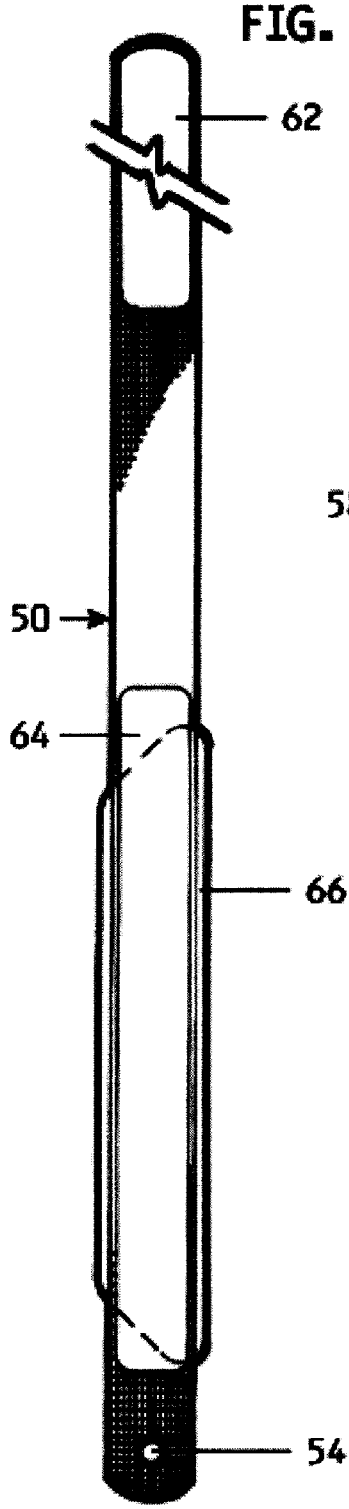
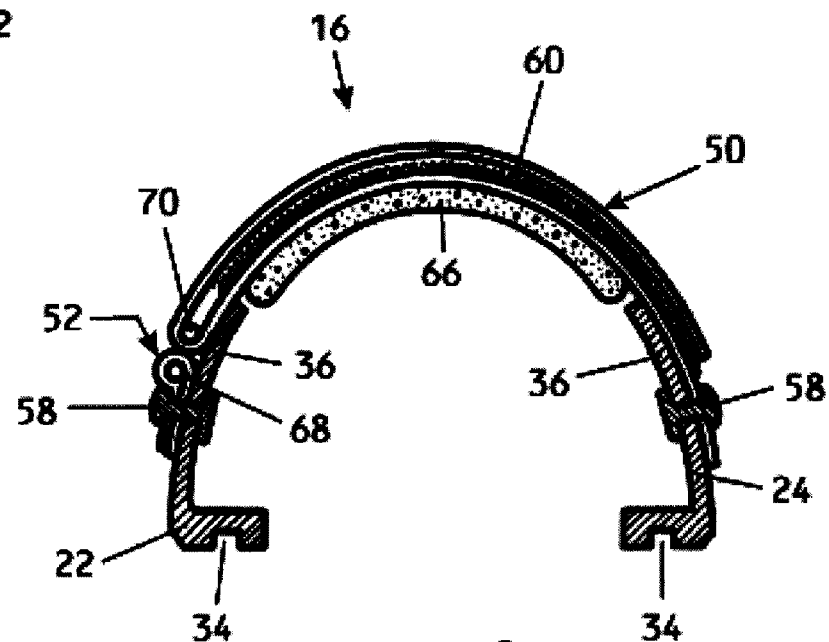
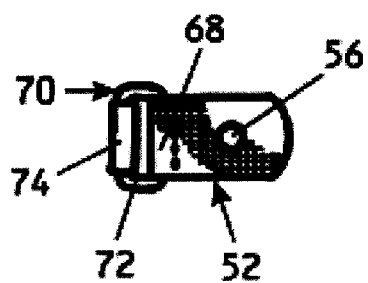

TEMPORARY HORSESHOE

FIELD OF THE INVENTION

The present invention is related to horseshoes. More specifically, the present invention relates to temporary horseshoes for use various veterinary applications or as a replacement horseshoe in situations where a horse has thrown a conventional steel shoe.

BACKGROUND OF THE INVENTION

As long as man and horse have been paired for work or pleasure, protecting the hooves of a horse has been an important part of horse caretaking. While a hoof is formed of a hard, bony material that is capable of withstanding a relatively large amount of stress, horses are made to travel, work, and perform under conditions not present in the wild.

The most widely used and recognizable device for protecting the hooves of a horse is the conventional metal horseshoe. The shoe is formed from a piece of metal that conforms to the shape of the bottom edge of the hoof. The shoe can be made of aluminum, titanium, or steel, and contains a number of openings along the curved centerline of the shoe. Nails are driven through the openings in the shoe and into the hoof to secure the shoe to the bottom of the hoof. When properly shod with shoes of this type, the hooves of the horse retain their shape and the edge of the hoof is protected from chipping or cracking.

Nevertheless, although the conventional horseshoe is easily manufactured and reliable, it is not without various shortcomings. As the shoe is normally attached to the hoof by a number of nails driven into the edge of the hoof, the nails may work loose over time for a number of reasons. When the nails loosen, it is likely that during the normal course of activity, the shoe will fall off the hoof, i.e. the horse will "throw" the shoe. Also, on occasion, the horse may step on a shoe secured to a front hoof with a hind leg, causing the front shoe to be "stepped off". In either situation, the hoof is left completely unprotected and may become chipped if the shoe is not replaced. Many times it is impossible to replace the shoe as there are usually no nails available to resecure the shoe on the horse. Also, the original shoe may be unusable as it has become lost or twisted beyond repair. In most cases, the horse must be led back to a stable for the shoe to be replaced by a farrier.

Furthermore, when a horse has medical problem with a hoof, the horse is not able to wear a conventional horseshoe during the treatment of the condition. This insures the conventional shoe will not exacerbate the condition and enables any veterinary treatments to be placed on the hoof. However, without a shoe, or some other form of protection on the hoof, the hoof is left unprotected and may become injured further.

Recently, certain devices have been developed to address the problems regarding thrown shoes and protection of the horse's hooves. Furthermore, some of these devices are able to protect the hoof even during veterinary treatment of the hoof. Many of these newer shoes are formed of, or incorporate elastomeric materials, such as polyurethane, because of their attractive combination of durability and the ability to dampen vibrations or shock.

One such device is the Shock Shod Horseshoe manufactured by Shock Shod International, El Segundo, Calif. This horseshoe consists of a polyurethane shock absorbent layer overlaying an aluminum support bar. When placed on a hoof, the aluminum bar provides a rigid protective layer directly beneath the hoof in the same manner as a conventional shoe. The polyurethane layer located beneath the aluminum bar contacts the ground and reduces the stress exerted on the hoof and leg of the horse while walking or running. The shoe is secured to the hoof by the insertion of a special shoeing nail into each of a number of openings in the shoe, much like a conventional shoe. The design of the openings retains the head of each nail driven through the openings to prevent the nails from coming loose, thereby preventing the horse from throwing the shoe.

However, while providing an alternative to the conventional shoe, the Shock Shod shoe does not eliminate all of the problems associated with the conventional shoe. As the Shock Shod shoe is still secured to the hoof by nails, the shoe still has all of the aforementioned drawbacks associated with the conventional shoe arising from the use of the nails to affix the shoe to the hoof. Also, the use of the nails to secure the shoe to the hoof prevents the Shock Shod shoe from being usable during the treatment of a medical condition of the hoof.

Furthermore, the Shock Shod shoe has other shortcomings associated with it that are not present with a conventional shoe. The Shock Shod shoe requires that the polyurethane layer be securely affixed to the aluminum support bar to form the shoe. This construction necessitates a complicated and costly process in which first, the bar is properly shaped to fit the hoof and retain the polyurethane layer, and second, the polyurethane layer is extruded over the bar. In short, the Shock Shod shoe, while superior in certain ways to the conventional horseshoe, has a complex construction that does not completely eliminate the problems associated with the conventional horseshoe.

Another prior art device designed to provide an alternative to conventional horseshoes and capable of use in certain medical applications is the Easyboot®, manufactured by EasyCare, Inc., Santa Fe, N. Mex. The Easyboot® is a boot for a horse that consists of a base integrally formed with a wall that extends upwardly along the periphery of the base. The wall covers the hoof almost entirely and is flexible to allow the boot to adapt to the unique shape of the hoof of any horse. The boot is secured on the hoof by a closure mechanism that negates the need for nails to secure the boot to the hoof. The mechanism includes a ski boot-type clamp disposed on the front part of the wall of the boot and a closed loop of a resilient cord that passes through openings in opposite sides of the wall of the boot. To secure the boot on the hoof, the cord is first placed within a groove on the interior of the ski boot clamp. The clamp is then pressed downwardly to close it. Closing the clamp pulls the cord forward and, as the cord is retained in the openings in the wall of the boot, it thereby constricts the sides of the wall of the boot tightly against the sides of the hoof.

While providing durable hoof protection, the Easyboot Easyboot® does present certain problems when in use. First, the ski boot-type clamp utilized in the closure mechanism exerts a large amount of pressure on the front of the hoof. This pressure leaves marks on the hoof, causing the hoof to become irritated, and possibly weakened, at that point. Also, the wall of the boot almost completely encloses the hoof. As the boot is formed of an impervious elastomeric material, this design prevents air from circulating around the hoof. When the Easyboot® is used on a hoof undergoing treatment for a medical condition, the lack of circulation created by the device may exacerbate or cause additional medical problems with the hoof.

SUMMARY OF THE INVENTION

The present invention is directed a temporary horseshoe that overcomes the problems with replacing "thrown" or "stepped off" shoes described above that are associated with prior art horseshoes or boots. The shoe may also be used to protect hooves undergoing veterinary treatment without interfering with that treatment. The shoe includes a toe and a heel and is formed of a unitary, injection-molded polyurethane sole. The sole has a base and a wall extending upwardly along the periphery of the top surface of the base. The wall extends upwardly only a short distance above the base to provide only the amount of restriction on the movement of the hoof relative to the base necessary to prevent the shoe from becoming disengaged from the hoof. The base and wall are also completely smooth to prevent any injury to the hoof caused by the shoe.

The base also includes an opening in the center of the base. The opening simulates the shape of a conventional shoe, thereby making the feel of the shoe closely resemble that of a conventional horseshoe. The opening also allows air to circulate under the shoe and around the hoof. This prevents any unwanted medical outcomes, and allows the shoe to be utilized even when the hoof is undergoing various veterinary treatments without hindering the treatment.

The opening extends rearwardly from the center of the base to form a channel that bisects the base and wall at the heel of the shoe. This channel allows the separate portions of the heel to be flexed outwardly relative to the rest of the shoe. This enables the person placing the shoe on a horse to create a wide opening in the heel of the shoe into which the hoof can be slid, facilitating the placement of the shoe on the hoof.

The shoe is held on the hoof by a number of separate features that work in concert with each other. First, a pair of flexible, breathable, retention panels are attached over the toe of the shoe. The retention panels overlap each other and contact the front of the hoof when the shoe is placed on the hoof. The panels flex to conform to the shape of the hoof while exerting certain forces on the hoof, urging the hoof into contact with the base and heel of the shoe.

Next, the shoe includes heel plates located in the wall of each heel portion. Each heel plate is a thickened section of the heel that enables heel of the shoe to return to its original shape after the heel portions have been flexed outwardly to enable the shoe to be positioned on the hoof. When the shoe is secured on the hoof, the heel plates also urge the hoof forwardly into contact with the retention panels.

Lastly, the shoe also includes a securing arrangement attached to the shoe over the base between a pair of flanges or tabs integrally formed with and extending from the wall on either side of the shoe. The arrangement is releasably placed around the rear of the horse's pastern (ankle) to rest at the top of the heel bulbs on a hollow where the pastern becomes the heel. To prevent the arrangement from irritating the horse's pastern, the arrangement also includes a soft medical foam pad surrounding the arrangement. The securing arrangement helps to hold the shoe on the hoof and also urges the hoof forwardly against the retention panels at the toe of the shoe.

BRIEF DESCRIPTION OF THE SEVERAL VIEWS OF THE DRAWING

In the drawings:

FIG. 4 is a side view of the sole of FIG. 2;

FIG. 5 is a bottom view of the sole of FIG. 2;

FIG. 6 is a cross-sectional view along line 6—6 of FIG. 3;

FIG. 7 is a cross-sectional view along line 7—7 of FIG. 6;

FIG. 8 is a cross-sectional view along line 8—8 of FIG. 3;

FIG. 9 is a cross-section view along line 9—9 of FIG. 1 showing details of the securing arrangement;

FIG. 10 is a plan view of the fastening strap of the securing arrangement of FIG. 9; and FIG. 11 is a plan view of the catch strap of the securing arrangement of FIG. 9.

DETAILED DESCRIPTION OF THE INVENTION

Figure 1:
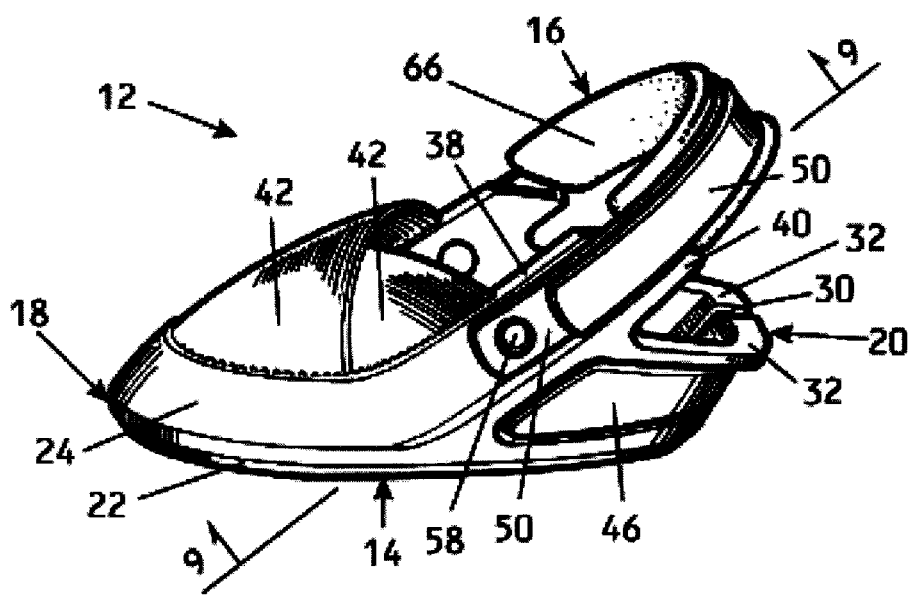
FIG. 1 is an isometric view of the temporary horseshoe of the present invention.

FIGS. 1–11 illustrate a non-invasive, temporary horseshoe 12 constructed according to the present invention. As shown in FIG. 1, the horseshoe 12 comprises a sole 14 having the general shape of a horse's hoof and a releasable securing arrangement 16 attached over the sole 14.

As shown in FIGS. 2–8, the sole 14 has a toe 18 and a heel 20 and is comprised of a thick base 22 that provides the stepping surface for the shoe 12, and a flexible enclosure or wall 24 that extends upwardly around the periphery of the base 22. The base 22 and sidewall 24 forming sole 14 are unitarily formed in a conventional injection molding process using an elastomeric compound. The preferred elastomeric material used is polyurethane. More specifically, polyurethane is the preferred material as it is durable and thin sections of the material are flexible and resilient, while thicker sections are more rigid. As the base 22 is in continuous and repeated contact with the ground, the base 22 must not only absorb the stress generated by this contact, but also must be sufficiently durable to withstand the wear associated with this contact. Therefore, the base 22 is thicker and formed of a larger amount of polyurethane than the wall 24 to increase the rigidity and durability of the base 22. A toe portion 25 of the wall 24 located at the toe 18 of the shoe 12 is also formed of a larger amount of polyurethane than the remainder of wall 24 to withstand the added stress exerted on that part of the wall 24 by the front of the hoof. Most preferably, the sole 14 formed in this manner has a base 22 with a durometer reading of 60 on the Shore D scale, and a wall 24 with a reading of 85–90 on a Shore A scale, not including the toe portion 25. Thus, by forming the base 22 with of a larger amount of polyurethane, the base 22 is made highly resistant to wear, while the wall 24, integrally formed with the base 22 but formed of a smaller amount of the same material, remains very flexible. The weight of the total amount of polyurethane used in forming the sole 14 gives the sole 14 a weight similar to that of a conventional steel horseshoe, providing the shoe 12 with a feel comparable to that of a conventional horseshoe. Also, as the sole 14 is formed to be completely smooth on all sides, the sole 14 will not irritate the hoof of the horse.

Figure 3:
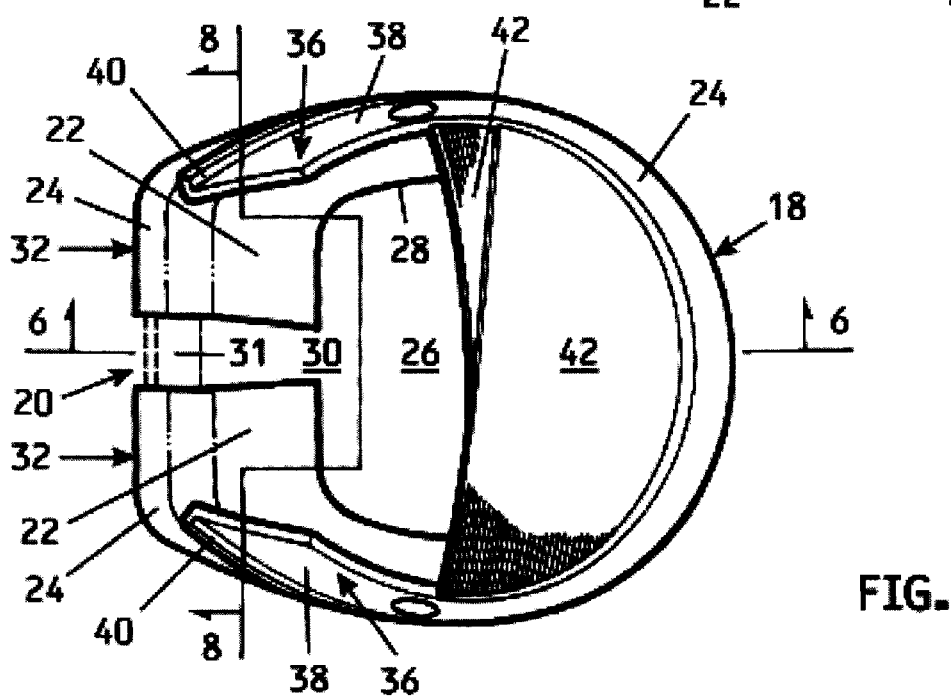
FIG. 3 is a top view of the sole of FIG. 2.

Looking now at FIGS. 3, 5 and 8, the base 22 includes an opening 26 disposed in the center of the base 22. The opening 26 defines an interior edge 28 on the base 22, giving base 22 an appearance that closely resembles a conventional horseshoe, as best shown in the bottom view of FIG. 5.

The opening 26 joins with a channel 30 that extends rearwardly from the opening 26 and bisects the base 22 and wall 24 at the heel 20 of sole 14 to form a pair of heel portions 32. Each heel portion 32 may flex independently of the rest of the sole 14. This enables the heel portions 32 to be moved to allow the hoof of a horse to more easily be positioned in the shoe 12. Preferably, the channel 30 remains open. However, the channel 30 may also be bridged by a flexible, segmented connector 31 that elastically connects the ends of the opposite heel portions 32 as shown in FIG. 3.

The base 22 also includes a number of traction grooves 34 disposed on the bottom surface of base 22, best shown in FIG. 5. The grooves 34 are semi-cylindrical in shape and extend into the base 22 along the curved midline of the base 22. The grooves 34 provide a space for water or other debris located on the surface on which the horse is stepping to enter, preventing that water or debris from creating a slippery or unstable surface under the base 22 of the shoe 12.

Figure 2:
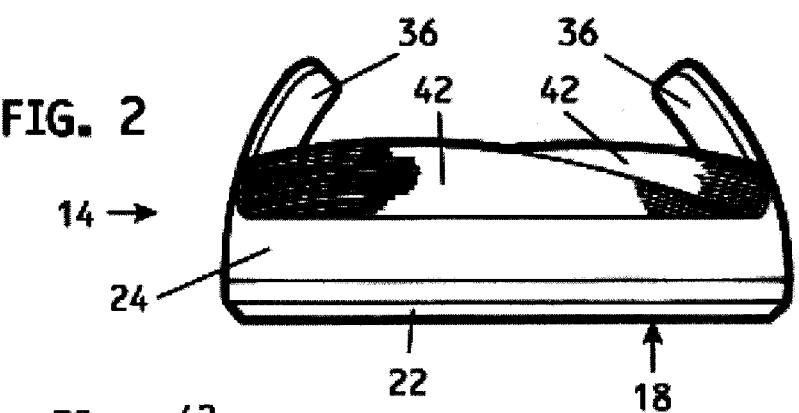
FIG. 2 is a front view of the sole of the horseshoe of FIG. 1.

Referring now to FIGS. 2, 4, and 6, the wall 24 slants upwardly from the base in a rearward direction from the toe 18 toward the heel 20, similar to the angle of a hoof of a horse. The wall 24 also includes a pair of flanges or tabs 36. The tabs 36 extend upwardly and rearwardly in the same direction as the wall 24. As best shown in FIG. 7, the tabs 36 include a flat portion 38 forming the front of the tab 36, and an annular shoulder 40 at the rear of the tab 36. The flat portion 38 is a continuous extension of the wall 24 leading from the toe 18 of the sole 14. The shoulder 40 is a thickened portion of wall 24 integrally formed with the sole 14. The shoulder 40 extends along the flat portion 38 downward to the base 22, as best illustrated in FIGS. 1 and 4. The shoulders 40 aid each tab 36 in retaining its shape by supporting the tabs 36 in an upright position.

To prevent the horse's hoof from slipping out of the shoe 12 while is use, the shoe 12 includes a number of elements that function in concert with each other to retain shoe 12 on the hoof. First, a pair of retention panels 42 are attached to the shoe 12 over the toe 18 between the tabs 36. Each retention panel 42 is formed of a breathable, elastic material, such as a nylon webbing, and is generally semi-circular in shape, as shown in FIG. 3. The panels 42 extend across the entire width of the sole 14 and overlap each other to provide complete coverage for the toe 18. The panels 42 are attached to the sole 14 in a slot 44 that is disposed within wall portion 25 at the toe 18 and extends within wall 24 to the flat portions 38 of each tab 36. The panels 42 are inserted in a layered fashion into the slot 44 and adhered therein using a suitable adhesive or heat bonding process. When the shoe 12 is placed on the hoof, the panels 42 provide a both downward and rearward thrust on the hoof. The downward thrust helps keep the hoof within the shoe 12. In an alternative embodiment, by adjusting the injection mold used to form the shoe 12, the panels 42 can be integrally formed with the rest of the sole 14, negating the need for the slot 44.

The next elements of the shoe 12 that aid in holding the hoof within the shoe 12 are heel plates 46. As shown in FIGS. 4 and 6, the heel plates 46 are disposed in each heel portion 32 of the sole 14. Each heel plate 46 is located within a depression 48 in the part of each heel portion 32 formed by wall 24. The plate 46 and depression 48 extend from the ends of each rear portion 32 along the wall 24 to a point beneath the tabs 36. Each heel plate 46 is formed of a rigid elastomeric material, such as rubber, and is generally rectangular in shape. The plates 46 are highly resilient and, when flexed, will snap back into their original shape when released. Therefore, the heel plates 46 function to urge each rear portion 32 into the closed position shown in FIGS. 1 and 3. So, when the heel portions 32 are flexed outwardly in order to place the shoe 12 on a hoof of a horse, the heel plates 46 force the heel portions 32 back into the closed position, when released, to cause shoe 12 to grip the hoof. Furthermore, each heel plate 46 also assists in holding the hoof in the shoe 12 by pressing the hoof forward against the retention panels 42 over the toe 18. Alternatively to the above preferred structure, the heel plates 46 may be formed integrally with the sole 14 during the injection molding process by increasing the amount of polyurethane used to form the rear portions 32 of the sole 14.

The final element of the shoe 12 used to retain the shoe 12 on the hoof is the securing arrangement 16. The securing arrangement 16 is attached to the sole 14 of shoe 12 between the tabs 36, as shown in FIGS. 1 and 9. The arrangement 16 includes a fastening strap 50 and a buckle strap 52. The fastening strap 50 is preferably formed of a nylon webbing and is secured to one of the tabs 36 by rivet 58 inserted through aligned holes 54 and 56 in fastening strap 50 and tab 36, respectively. The rivet 58 is not rigidly attached to either the fastening strap 50 or tab 36, so the fastening strap 50 may rotate about the fastening 58 with respect to the tab 36 in order to accommodate differences among hooves on different horses. However, the shoulder 40 present on the tab 36 prevents the fastening strap 50 from rotating beyond a proper position on the sole 14.

The fastening strap 50 further includes a releasable hook and loop closure 60. The closure 60 comprises a hook panel 62 mounted opposite a loop panel 64 when strip 50 is folded over as shown in FIG. 9. The fastening strap 50 also preferably includes a soft foam pad 66 disposed on the inside of the fastening strap 50. The pad 66 contacts the rear of a horse's leg above the hoof when the fastening strap 50 is in use, and prevents the fastening strap 50 from rubbing against or irritating the rear of the horse's leg.

The buckle strap 52 is formed from nylon webbing, includes a hole 54 and is attached in the same manner as the fastening strap 50 to the tab 36 opposite the fastening strap 50. The buckle strap 52 includes a closed loop 68 that encloses a buckle 70 located at the end of buckle strap 52 opposite the hole 54. The buckle 70 is formed of a generally rectangular plastic piece 72 having one long side disposed within the closed loop 68 and a cylinder 74 disposed about the opposite long side to facilitate insertion and removal of the fastening strap 50. Fastening strap 50 is inserted through buckle 70 and folded over itself to engage hook and loop panels 62, 64 to secure the strap 10. When the securing arrangement 16 is engaged about the ankle of the horse, the arrangement 16 pulls the shoe 12 rearwardly, forcing the hoof of the horse forward into contact with the panels 42 and toe 18 to hold the shoe 12 on the hoof.

To place the shoe 12 on the hoof of a horse, first the heel portions 32 of the shoe 12 are manually separated to provide a sufficient opening for the horse's hoof to enter the shoe 12. The hoof is then slid onto the sole 14 of the shoe 12 so that the front of the hoof slides beneath the retention panels 42 extending over the toe 18 of the shoe 12 and the edge of the hoof is properly positioned against the wall 24 on the base 22. Once the hoof has been pressed firmly against the toe 18 and wall 24 of the shoe 12, the heel portions 32 are released allowing them to close about the rear of the hoof. The shoe 12 is then secured on the hoof of the horse using the securing arrangement 16 by sliding the hook panel 62 on fastening strap 50 through the buckle 70 on buckle strap 52 so that the pad 66 contacts the rear of the horse's ankle above the hoof. The fastening strap 50 is then pulled to tighten the arrangement 16 and pad 66 against the rear of the ankle of the horse, and the hook panel 62 engaged with the loop panel 64 to securely fasten the closure 60 about the leg of the horse.

To remove the shoe 12, the closure 60 of the arrangement 16 is disengaged and fastening strap 50 is slipped out of the buckle 70. The heel portions 32 are then manually flexed outwardly to provide a sufficient opening for the hoof to slide rearwardly from under the retention panels 42 and out of the shoe 12.

I claim:

1. A horseshoe suitable for being temporarily affixed to the hoof of a horse, the horseshoe comprising the following elements in a unitary, integral construction:
   a sole including a base having a toe, heel, top surface and bottom surface, the top surface receiving the bottom of the hoof when the horseshoe is placed on the hoof, the sole having a wall upwardly extending along a periphery of the top surface of the base for partially embracing the hoof;
   at least one retention panel extending from said wall over the top surface at the toe of the base for receiving the hoof; and
   a releasable securing arrangement secured to the base and extending over the top surface of the base adjacent the heel of the base for extending around behind the ankle of the horse to urge the hoof into engagement with the retention panel.

2. The horseshoe of claim 1 wherein the base includes an opening disposed in the center of the base, the opening forming said top and bottom surfaces into an arcuate shape.

3. The horseshoe of claim 2 wherein the opening includes a channel bisecting the heel of the base.

4. The horseshoe of claim 3 wherein the channel is bridged by a flexible, segmented member.

5. The horseshoe of claim 2 wherein the base includes a number of traction grooves disposed in the bottom surface of the base.

6. The horseshoe of claim 1 wherein the base has a thickness greater than the wall.

7. The horseshoe of claim 6 wherein the sole is formed of an elastomeric material.

8. The horseshoe of claim 7 wherein the sole is formed of polyurethane.

9. The horseshoe of claim 1 further comprising a pair of tabs upwardly extending from the wall and wherein the securing arrangement is attached between the tabs.

10. The horseshoe of claim 9 wherein the securing arrangement includes a foam pad on the interior of the securing arrangement for abutting the leg of the horse.

11. The horseshoe of claim 10 wherein the securing arrangement includes a hook and loop closure.

12. The horseshoe of claim 11 wherein the securing arrangement is formed of nylon webbing.

13. The horseshoe of claim 1 wherein the base has sufficient rigidity to support the hoof and wherein the wall is flexible for embracing hoof.

14. The horseshoe of claim 13 wherein the base of the sole has a hardness of approximately 60 on the Shore D scale.

15. The horseshoe of claim 13 wherein the wall has a general hardness of approximately 85–90 on the Shore A scale.

16. A temporary horseshoe suitable for being affixed to the hoof of a horse, the horseshoe comprising:
   a sole formed of an elastomeric material including a base having a toe, heel, top surface and bottom surface, the top surface receiving the bottom of the hoof when the horseshoe is placed on the hoof, the sole having a wall upwardly extending along a periphery of the top surface of the base for partially embracing the hoof;
   a first retention panel extending from the wall over the top surface of the toe of the base for receiving the hoof;
   a second retention panel extending from the wall over the top surface of the toe of the sole for receiving the hoof and overlapping the first retention panel;
   a pair of tabs extending upwardly and rearwardly from the wall; and
   a releasable securing arrangement secured between the tabs and extending over the top surface of the base adjacent the heel of the base for extending around behind the ankle of the horse to urge the hoof into engagement with the first and second retention panels.

17. The horseshoe of claim 16 wherein the first and second retention panels are formed separately from the sole.

18. The horseshoe of claim 17 wherein the first and second retention panels are retained within a slot disposed in the wall.

19. The horseshoe of claim 18 wherein the first and second retention panels are formed of an elastic material.

20. A temporary horseshoe suitable for being affixed to the hoof of a horse, the horseshoe comprising the following elements in a unitary, integral construction:
   a sole formed of an elastomeric material including a base having a toe, heel, top surface and bottom surface, the top surface receiving the bottom of the hoof when the horseshoe is placed on the hoof, the sole having a wall upwardly extending along a periphery of the top surface of the base for partially embracing the hoof;
   at least one retention panel extending from the wall over the top surface of the toe of the base or receiving the hoof;
   a pair of tabs extending upwardly and rearwardly from the wall;
   a releasable securing arrangement secured between the tabs and extending over the top surface of the base adjacent the heel of the base for extending around behind the ankle of the horse to urge the hoof into engagement with the retention panel;
   a channel bisecting the heel of the sole into a pair of heel portions movable from a contiguous position to a separated position; and
   at least one heel plate disposed in a heel portion of the sole for biasing the heel portion to the contiguous position.

21. The horseshoe of claim 20 wherein the heel plate is formed separately from the sole.

22. The horseshoe of claim 21 wherein the heel plate is located in a depression located in the wall forming the heel portion of the sole.

23. The horseshoe of claim 22 wherein the heel plate is formed of an elastomeric material.

24. The horseshoe of claim 23 wherein the sole is formed of polyurethane.

* * * * *